(No Model.)

J. G. CURTIS.
Elevated Railway.

No. 242,606. Patented June 7, 1881.

WITNESSES:
F. McArdle.
C. Sedgwick.

INVENTOR:
J. G. Curtis
Munn & Co.
ATTORNEYS.

UNITED STATES PATENT OFFICE.

JOHN G. CURTIS, OF LUDLOW, PENNSYLVANIA.

ELEVATED RAILWAY.

SPECIFICATION forming part of Letters Patent No. 242,606, dated June 7, 1881.

Application filed March 19, 1881. (No model.)

*To all whom it may concern:*

Be it known that I, JOHN G. CURTIS, of Ludlow, in the county of McKean and State of Pennsylvania, have invented a new and useful Improvement in Elevated Railways, of which the following is a full, clear, and exact description.

My invention is more particularly intended for use inside of a building, to convey goods from one part of the building to another, and it may also be used for conveying goods from one building to another, or from place to place in a tannery or other extensive establishments.

The invention consists in a novel construction, arrangement, and combination of an elevated rail or track, a two-wheeled truck or trucks, and a car or platform suspended from said trucks, as hereinafter particularly described.

Figure 1:
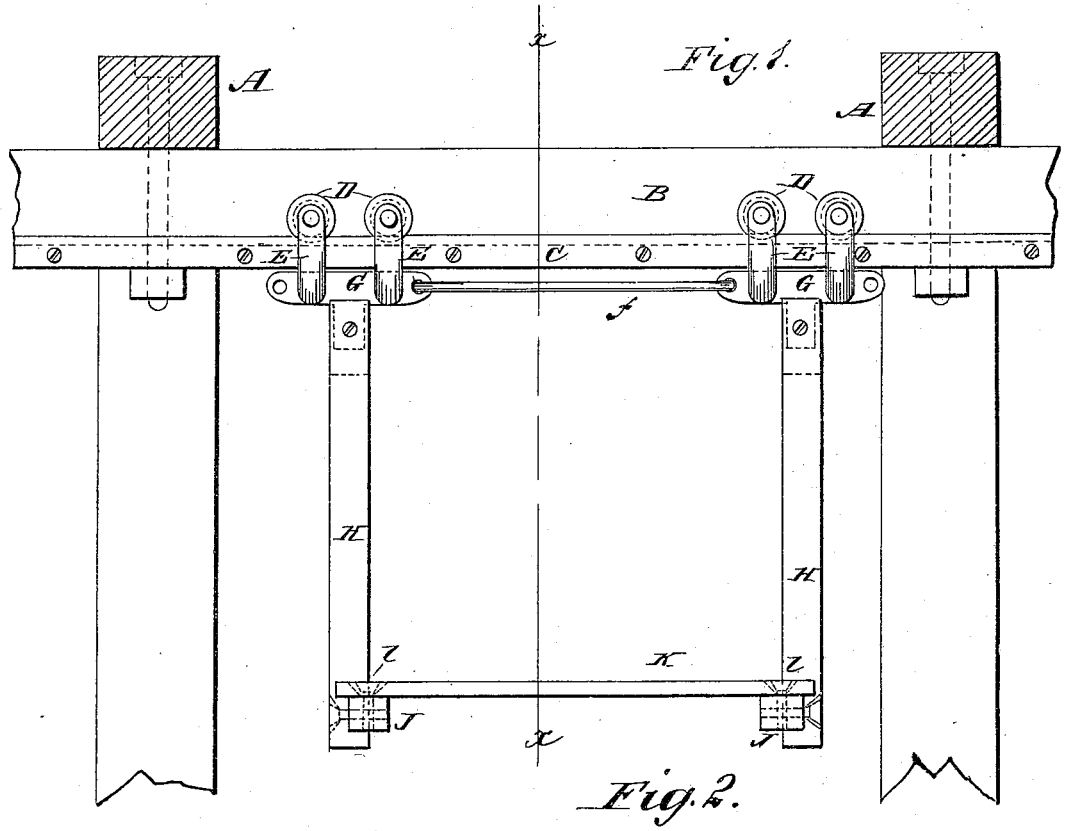
Figure 2:
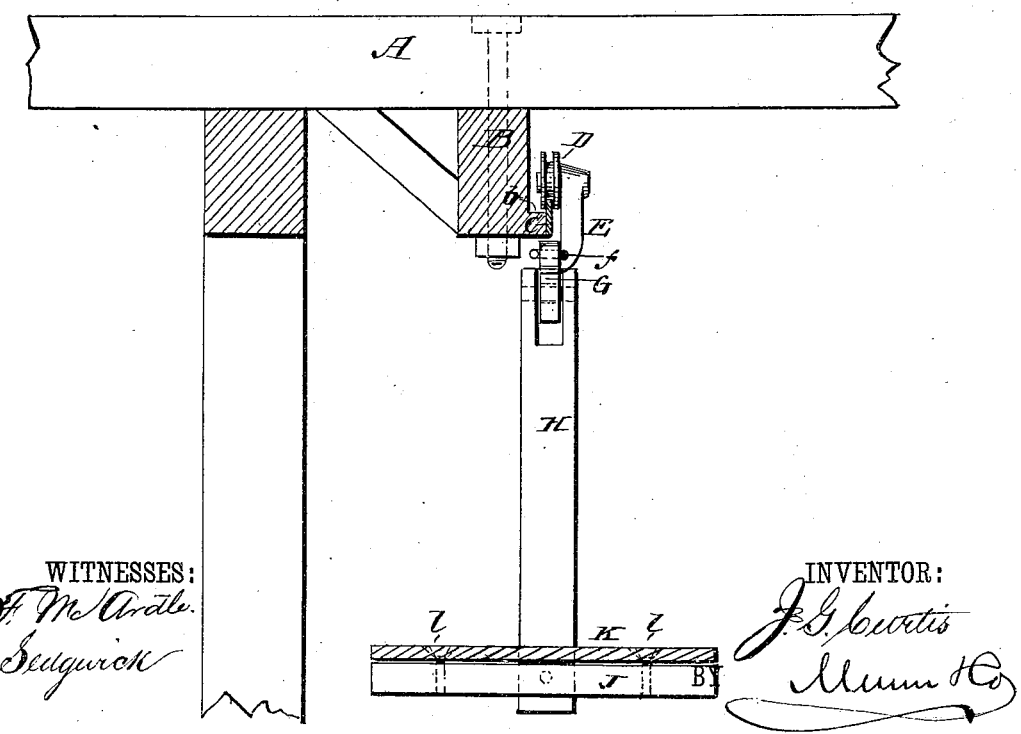

In the accompanying drawings, Figure 1 is a side view of an apparatus embodying my improvements. Fig. 2 is a transverse vertical section taken in the line $x\ x$, Fig. 1.

Similar letters of reference indicate corresponding parts.

A represents a rafter of the roof or ceiling of the apartment in which the apparatus is used, or one of the beams of a frame-work erected for the purpose when the apparatus is used out of doors.

To a number of rafters, A, is secured a beam, B, by means of bolts and nuts. The lower side of the beam B has a projecting rib or tongue, $b$, on one side, which may be a part of said beam, or may be formed by bolting a strip thereto.

To the vertical side of the rib or tongue $b$ an iron bar, C, is bolted or screwed, so that its upper edge extends somewhat above the upper surface of said rib and forms the rail or track for the wheels D of the car or truck to run on. These wheels are journaled in or on hangers E, formed with or attached to a T-head, G, thus forming a two-wheeled truck. There may be any suitable number of trucks used for each car or platform; but as here shown there are two trucks, connected by a rod, $f$.

To the vertical bar of each T-head is pivoted the upper end of a bar, H, the lower end of which is secured to a beam, J, arranged at right angles to the rail and truck. On the top of the two beams J, thus suspended, rests the platform K, through which screws $l$ pass into the beams J, so as to hold the platform in place, but allow it to swing so as to maintain a level position when the trucks are traveling over a portion of the rail which is inclined either up or down, the holes through which the screws pass being enlarged or elongated for that purpose.

Having thus described my invention, I claim as new, and desire to secure by Letters Patent—

The combination, with the T-heads G, connected by the rod $f$, pivoted bars H, cross-beams J, and platform K, loosely attached to said beams, substantially as and for the purpose herein described.

JOHN G. CURTIS.

Witnesses:
W. J. MORRIS,
SAM. PETTERSON.